United States Patent
Woenarta

(10) Patent No.: US 11,313,430 B2
(45) Date of Patent: Apr. 26, 2022

(54) VIBRATION DAMPER, MOTOR VEHICLE AND METHOD FOR MOUNTING A VIBRATION DAMPER

(71) Applicants: ThyssenKrupp Bilstein GmbH, Ennepetal (DE); thyssenkrupp AG, Essen (DE)

(72) Inventor: Freddy Woenarta, Braunschweig (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 68 days.

(21) Appl. No.: 16/824,329

(22) Filed: Mar. 19, 2020

(65) Prior Publication Data
US 2020/0309230 A1    Oct. 1, 2020

(30) Foreign Application Priority Data
Mar. 28, 2019 (DE) ..................... 10 2019 108 092.4

(51) Int. Cl.
*B60G 13/06* (2006.01)
*F16F 9/56* (2006.01)
*F16F 9/34* (2006.01)

(52) U.S. Cl.
CPC . *F16F 9/56* (2013.01); *F16F 9/34* (2013.01)

(58) Field of Classification Search
CPC .... F16F 9/062; F16F 9/064; F16F 9/34; F16F 9/43; F16F 9/56
USPC ............... 188/315, 322.13, 322.14
See application file for complete search history.

(56) References Cited

U.S. PATENT DOCUMENTS

| 3,948,498 | A | * | 4/1976 | Hirano | B60R 19/32 267/35 |
| 5,072,813 | A | | 12/1991 | Yoshioka | |
| 6,321,888 | B1 | * | 11/2001 | Reybrouck | F16F 9/325 188/299.1 |
| 6,659,243 | B2 | * | 12/2003 | Yasuda | F16F 9/062 188/322.17 |
| 7,028,817 | B1 | * | 4/2006 | Anderson | F16F 9/3242 188/322.17 |
| 7,950,506 | B2 | * | 5/2011 | Nowaczyk | F16F 9/466 188/266.6 |
| 8,109,491 | B2 | * | 2/2012 | Handke | F16F 9/585 267/220 |
| 2011/0095462 | A1 | | 4/2011 | Jinnouchi | |

(Continued)

FOREIGN PATENT DOCUMENTS

| CN | 101024413 A | 8/2007 |
| CN | 102052421 A | 5/2011 |

(Continued)

*Primary Examiner* — Christopher P Schwartz
(74) *Attorney, Agent, or Firm* — thyssenkrupp North America, LLC

(57) ABSTRACT

A vibration damper for a motor vehicle includes a valve block and at least one tube assembly. The tube assembly has at least one inner tube and one outer tube which are arranged coaxially. The valve block is arranged in a fluid-tight manner at one axial end of the tube assembly. At least the outer tube is connected in an integrally joined manner to the valve block, and a ring nut is provided at least on the outer tube. The ring nut transmits a prestressing force, in particular a pressing force, to the at least one inner tube such that the at least one inner tube is connected in a non-positive manner to the valve block.

11 Claims, 2 Drawing Sheets

(56) References Cited

U.S. PATENT DOCUMENTS

| | | | |
|---|---|---|---|
| 2011/0290603 A1* | 12/2011 | Yabe | F16F 9/348 |
| | | | 188/282.1 |
| 2016/0040742 A1 | 2/2016 | Yamashita et al. | |
| 2016/0101662 A1* | 4/2016 | Konakai | F16F 9/36 |
| | | | 188/315 |
| 2017/0080767 A1 | 3/2017 | Yamashita | |
| 2017/0261061 A1 | 9/2017 | Chikamatsu et al. | |
| 2017/0276205 A1 | 9/2017 | Ogawa et al. | |
| 2020/0307336 A1* | 10/2020 | Woenarta | F16F 9/064 |

FOREIGN PATENT DOCUMENTS

| | | |
|---|---|---|
| CN | 102261419 A | 11/2011 |
| CN | 204372028 U | 6/2015 |
| CN | 105143707 A | 12/2015 |
| CN | 105793603 A | 7/2016 |
| CN | 107076243 A | 8/2017 |
| CN | 107076244 A | 8/2017 |
| CN | 207539250 U | 6/2018 |
| DE | 10 2010 021 913 A | 12/2010 |
| DE | 10 2011 102 513 A | 1/2012 |
| DE | 10 2015 218 296 A | 3/2016 |
| EP | 3 211 263 A | 8/2017 |

* cited by examiner

VIBRATION DAMPER, MOTOR VEHICLE AND METHOD FOR MOUNTING A VIBRATION DAMPER

CROSS REFERENCE TO RELATED APPLICATION

This application is a U.S. Non-provisional patent application, which claims priority to German Patent Application No. DE 10 2019 108 092.4, filed Mar. 28, 2019, the entire content of which is incorporated herein by reference.

FIELD

The present disclosure generally relates to a vibration damper, to a motor vehicle, and to a method for mounting a vibration damper.

BACKGROUND

Vibration dampers are usually used for motor vehicles, for sports vehicles and in the industrial field. In the case of vibration dampers, a distinction is generally made between monotube dampers, twin-tube dampers and multiple-tube dampers. In contrast to monotube dampers, twin-tube or multiple-tube dampers operate with a lower system pressure. They make exact damping and a low noise level possible at high compression speeds.

For example, four concentrically arranged spaces are required in the vibration damper in order to realise an active damping system. Here, the damping force is generated in the two inner spaces. The two outer spaces serve as compensation spaces and in each case form a hydraulic accumulator.

A vibration damper is known, for example, from German Patent Application No. DE 10 2015 218 296 A1 which was mentioned at the outset. The vibration damper comprises a working cylinder, in which a piston rod with a piston is guided in an axially movable manner. Furthermore, the vibration damper has a first and a second cylinder tube which delimit a first and a second annular space. The first cylinder tube is of double-walled configuration, a further space being formed between the said first cylinder tube and the working cylinder. The second or outer cylinder tube and the working cylinder are screwed into a bottom of the vibration damper. Here, the working cylinder prestresses the first or inner cylinder tube against the bottom via a stressing face.

It is disadvantageous here that the seals which are provided can be damaged between the tubes during screwing in, since the tubes are in frictional contact with the seals during screwing in. A fluid-tight seal between the tubes therefore cannot be ensured. In addition, it is disadvantageous that an increased space requirement in the region of the bottom is necessary as a result of the screw connections of the tubes to the bottom. Furthermore, a component complexity is increased as a result. On account of the fact that the tubes are connected to the bottom merely by way of screw connections, the vibration damper has a reduced damper stability.

Thus a need exists for a vibration damper which can be mounted simply as a result of an improved, structural construction, and has a compact overall design and an increased stability. Furthermore, the invention is based on a motor vehicle and a method for mounting a vibration damper.

DETAILED DESCRIPTION

Figure 1:
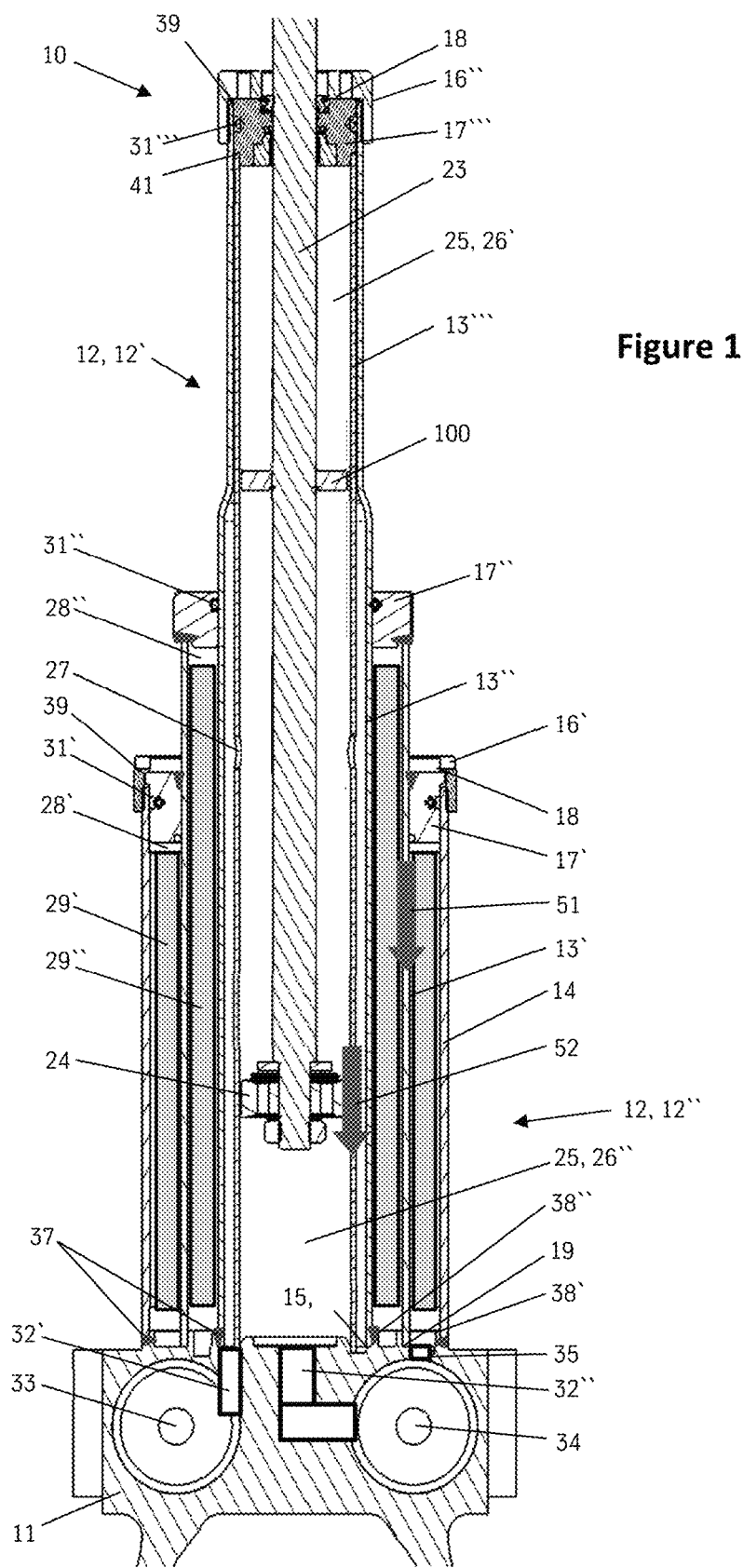
FIG. 1 is a longitudinal sectional view of a vibration damper in accordance with one preferred exemplary embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a vibration damper, to a motor vehicle, and to a method for mounting a vibration damper. A vibration damper that may form the basis for the invention is shown, for example, in German Patent Application No. DE 10 2015 218 296 A1, the subject matter of which is incorporated herein by reference.

Specifically, a vibration damper for a motor vehicle includes a valve block and at least one tube assembly and has at least one inner tube and one outer tube. The at least one inner tube and the outer tube are arranged coaxially. The valve block is arranged in a fluid-tight manner at one axial end of the tube assembly, at least the outer tube being connected in an integrally joined manner to the valve block, and a ring nut is provided at least on the outer tube. The ring nut transmits a prestressing force, in particular a pressing force, to the at least one inner tube in such a way that the at least one inner tube is connected in a non-positive manner to the valve block.

The invention has various advantages. As a result of the coaxial arrangement, an annular space is advantageously configured between the inner tube and the outer tube, which annular space serves as a damper space or as a compensation space. The outer tube is connected to the valve block in a fluid-tight manner by way of the integrally joined connection. The outer tube can be welded to the valve block. This has the advantage that an additional sealing element for sealing the outer tube with respect to the valve block is dispensed with, as a result of which costs are reduced. Furthermore, the configuration of at least one corresponding sealing face is dispensed with, as a result of which installation space is saved in the vibration damper and a compact overall design of the vibration damper is achieved.

Furthermore, it is advantageous that the integrally joined connection can absorb and/or transmit high tensile forces for prestressing the inner tube. The vibration damper has an increased stability as a result. Furthermore, an operational reliability and a service life of the vibration damper are increased by way of the integrally joined connection.

The ring nut is arranged at least on the outer tube, and transmits a prestressing force to the inner tube. The inner tube is prestressed against the valve block by way of the transmitted or introduced prestressing force. A fluid-tight connection is advantageously established as a result. The ring nut has the advantage that the prestressing force, by way of which the inner tube is prestressed against the valve block, can be set precisely. The prestressing force can be changed in an infinitely variable manner, in particular can be increased or can be decreased.

The ring nut can preferably be rotated independently of the outer tube and the inner tube. As a result, the inner tube can advantageously be loaded with the prestressing force in a gentle manner. This has the advantage that, during the prestressing by way of the ring nut, the inner tube is not co-rotated with the latter, as a result of which precise mounting and/or precise assembly of the vibration damper are/is made possible.

By way of the combination of the integrally joined connection of the outer tube and the non-positive connection of the inner tube to the valve block, the vibration damper can therefore advantageously be mounted or assembled simply and rapidly via the ring nut. As a result, mounting complexity and therefore the manufacturing costs of the vibration damper are reduced.

Preferred embodiments of the invention are specified in the subclaims.

In the case of one particularly preferred embodiment, the ring nut is screwed to the outer tube in such a way that the inner tube is prestressed against the valve block in a fluid-tight manner. In other words, the ring nut introduces a prestressing force into the inner tube by way of the screwing to the outer tube, with the result that the inner tube is pressed against the valve block in a fluid-tight manner. The valve block can have a sealing face, with which the inner tube interacts in a fluid-tight manner for sealing purposes by way of the prestressing force. The outer tube and the ring nut can have an internal thread and/or an external thread. It is advantageous here that, as a result of the fluid-tight prestressing of the inner tube, an additional sealing element for sealing the inner tube with respect to the valve block is dispensed with, as a result of which the overall costs of the vibration damper are reduced.

In the case of one preferred embodiment, at least one closure element is provided which is arranged between the outer tube and the inner tube, the ring nut transmitting the prestressing force via the closure element from the outer tube to the inner tube. In other words, the ring nut interacts with the closure element in order to transmit the prestressing force to the inner tube. The ring nut introduces the prestressing force into the inner tube by way of the closure element, with the result that the inner tube is prestressed or pressed in a fluid-tight manner against the valve block. During the screwing of the ring nut to the outer tube, the closure element can be capable of being displaced in the longitudinal direction relative to the outer tube. As a result of the arrangement of the closure element between the outer tube and the inner tube, an intermediate space, in particular a damper space or a compensation space, is advantageously closed towards the outside on the piston rod side. Furthermore, it is advantageous that the ring nut can be handled in an improved manner as a result of the indirect introduction of the prestressing force via the closure element. As a result, mounting and/or assembly of the vibration damper are/is simplified.

In the case of a further preferred embodiment, the closure element is connected to the inner tube in an integrally joined manner for the transmission of the prestressing force. In other words, the closure element is connected fixedly to the inner tube. The closure element can be welded to the inner tube. More specifically, the closure element can be welded to the inner tube on an outer surface of the inner tube. During the screwing of the ring nut to the outer tube, the prestressing force is introduced in the longitudinal direction into the inner tube via the closure element, with the result that the inner tube is pressed against the valve block in a fluid-tight manner. As a result of the integrally joined connection, the prestressing force is advantageously transmitted reliably to the inner tube, as a result of which a fluid-tight prestressing of the inner tube against the valve block is achieved.

Furthermore, the closure element can be sealed in a fluid-tight manner with respect to the inner tube as a result of the integrally joined connection. Furthermore, the closure element can comprise at least one sealing element which seals the closure element with respect to the outer tube. The sealing element can be formed by way of an O-ring.

In the case of a further preferred embodiment, the closure element interacts with the inner tube in a positively locking manner in such a way that the prestressing force is transmitted from the ring nut to the inner tube. In other words, the prestressing force is transmitted from the ring nut to the inner tube by way of a positively locking connection between the closure element and the inner tube. To this end, the inner tube can have at least one positively locking means, in particular a rolled portion or a shaped bead, against which the closure element bears for the transmission of the prestressing force. The closure element can have at least one opposing shaped recess, with which the closure element on the positively locking means of the inner tube interacts for the transmission of the prestressing force. It is advantageous here that assembly and/or mounting of the vibration damper are/is simplified. Furthermore, it is advantageous that the prestressing force is introduced directly into the inner tube by way of the positively locking connection, as a result of which a connection with an increased fluid-tightness can be established between the inner tube and the valve block. As a result of the direct introduction, the inner tube can advantageously be loaded with an increased prestressing force. The vibration damper has a construction of increased robustness.

The closure element preferably has at least one bearing region, with which the ring nut interacts for the transmission of the prestressing force. The bearing region can be formed by way of at least one outer face which interacts with an inner face of the ring nut for the transmission of the prestressing force. Here, the ring nut bears with the inner face against the bearing region. The prestressing force can be generated by way of the surface pressure between the ring nut and the closure element. The bearing region advantageously represents a structurally simple solution, for introducing the prestressing force into the inner tube.

The inner tube is further preferably prestressed in a fluid-tight manner with one end side against the valve block by way of the ring nut. The end side of the inner tube can bear against the valve block in a seal region. The inner tube and the valve block can interact in a metallically sealing manner for sealing purposes. It is advantageous here that merely a small region is required on the valve block for bearing against the end side of the inner tube. Installation space is saved as a result.

In the case of one preferred embodiment, the tube assembly comprises at least three inner tubes, a first ring nut transmitting a first prestressing force from the outer tube to a first inner tube, a second ring nut transmitting a second prestressing force from a second inner tube to a third inner tube, and a third ring nut transmitting a third prestressing force from the first inner tube to the second inner tube, with the result that the inner tubes are prestressed in a fluid-tight manner against the valve block by way of the ring nuts. The outer tube is connected to the valve block in an integrally joined manner. This embodiment has the advantage that merely a single integrally joined connection is required, in order to prestress the inner tubes against the valve block in a fluid-tight manner via the ring nuts. The inner tubes are connected in each case to the valve block in a non-positive manner. This has the advantage that the vibration damper can be mounted and/or assembled in a rapid and simple manner. Furthermore, the respective prestressing force can be set for each inner tube specifically for the requirements by way of the ring nuts. In addition, the vibration damper can advantageously be manufactured inexpensively.

A first closure element can be arranged between the outer tube and the first inner tube, the first ring nut transmitting the first prestressing force via the first closure element from the outer tube to the first inner tube. A second closure element can be arranged between the first inner tube and the second inner tube, the third ring nut transmitting the third prestressing force via the second closure element from the first inner tube to the second inner tube. A third closure element can be arranged between the second inner tube and the third inner tube, the second ring nut transmitting the second prestressing force via the third closure element from the second inner tube to the third inner tube. As described above, the closure elements can be connected to the respective inner tubes for prestressing the inner tube.

In the case of a further preferred embodiment, at least two tube assemblies are provided which are arranged coaxially, the outer tubes of the tube assemblies being connected to the valve block in an integrally joined manner, and the inner tubes of the tube assemblies being prestressed against the valve block for the fluid-tight connection by means of in each case one ring nut. In other words, the vibration damper preferably has two tube assemblies, a first tube assembly being arranged coaxially in a second tube assembly. It is advantageous here that the vibration damper has an increased stability by way of the two integrally joined connections to the valve block. Furthermore, the vibration damper can advantageously be manufactured in a simple and inexpensive manner.

At least one second closure element is preferably arranged between the two tube assemblies, which second closure element seals a compensation space towards the outside. The further closure element can be connected to the inner tube of the second tube assembly in an integrally joined manner for fluid-tight sealing purposes. Furthermore, the further closure element can have at least one sealing element which seals the further closure element in a fluid-tight manner with respect to the outer tube of the first tube assembly. The compensation space is advantageously closed in a fluid-tight manner by way of the further closure element in a simple way. As a result, the vibration damper has a simplified structural construction and therefore a compact overall design.

A further independent aspect of the invention relates to a motor vehicle having at least one vibration damper according to the invention.

In the case of a method according to the invention for mounting a vibration damper according to the invention, the said vibration damper comprises a valve block and at least one tube assembly which has at least one inner tube and one outer tube. The inner tube and the outer tube are arranged coaxially, the valve block being arranged in a fluid-tight manner at one axial end of the tube assembly. At least the outer tube is connected to the valve block in an integrally joined manner, and a ring nut is provided at least on the outer tube, by way of which ring nut a prestressing force, in particular a pressing force, is transmitted to the at least one inner tube in such a way that the at least one inner tube is connected in a non-positive manner to the valve block.

In respect of the advantages of the motor vehicle and the method for mounting a vibration damper according to the invention, reference is made to the advantages which have been mentioned in conjunction with the vibration damper. Moreover, as an alternative or in addition, the motor vehicle and the method can have individual features or a combination of a plurality of features which have previously been mentioned in relation to the vibration damper.

Figure 2:
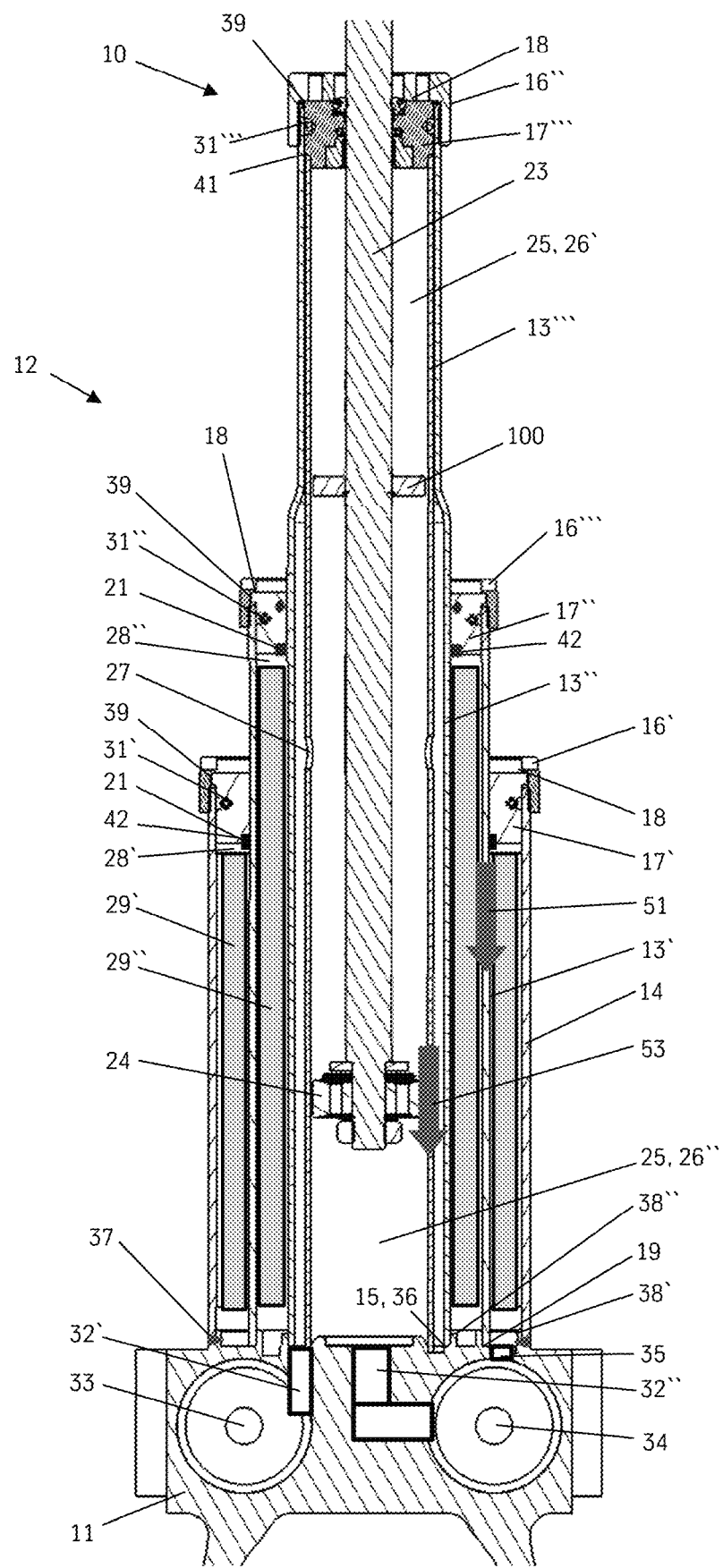
FIG. 2 is a longitudinal sectional view of a vibration damper in accordance with a further exemplary embodiment.

FIGS. 1 and 2 in each case show a vibration damper 10 for a motor vehicle in accordance with one exemplary embodiment according to the invention, which vibration damper 10 comprises an outer tube 14, a first inner tube 13', a second inner tube 13" and a third inner tube 13''' which are arranged coaxially. The vibration damper 10 has a piston rod 23 with a piston 24 which is guided in the third inner tube 13''' such that it can be moved in the longitudinal direction of the vibration damper 10. A stop plate 100 may be disposed within the third inner tube 13''' about the piston rod 23. The piston 24 comprises at least two valve units for the rebound stage and the compression stage. Furthermore, the piston 24 divides the interior space 25 of the third inner tube 13''' into a first working space 26' and a second working space 26". According to FIGS. 1 and 2, the first working space 26' is shown arranged at the top and the second working space 26" is shown arranged at the bottom.

As described above, the tubes 13', 13", 13''', 14 are arranged coaxially. The third inner tube 13''' is arranged in the second inner tube 13". An annular intermediate space 27 which is connected fluidically to the first working space 26' is configured between the third and the second inner tube 13''', 13". The intermediate space 27 forms an extension of the first working space 26'. The intermediate space 27 is configured partially in the longitudinal direction of the vibration damper 10. In other words, the intermediate space 27 is configured over a part length of the second and third inner tube 13'''.

The second and third inner tube 13", 13''' are both arranged in the first inner tube 13', the first inner tube 13' being arranged in the outer tube 14. In other words, the first inner tube 13' is arranged between the second inner tube 13" and the outer tube 14. In summary, as viewed transversely with respect to the longitudinal direction of the vibration damper 10, the outer tube 14, the first inner tube 13', the second inner tube 13" and the third inner tube 13''' are arranged in this sequence from the outside to the inside.

A first annular space 28' is configured between the outer tube 14 and the first inner tube 13'. Furthermore, a second annular space 28" is configured between the first inner tube 13' and the second inner tube 13". Here, a first gasbag 29' for the compression stage is arranged in the first annular space 28', and a second gasbag 29" for the rebound stage is arranged in the second annular space 28". The working spaces 26', 26", the intermediate space 27 and the two annular spaces 28', 28" are filled with a hydraulic liquid, for example a damper oil. Furthermore, the gasbags 29', 29" are filled with a damper gas, for example nitrogen.

Furthermore, the vibration damper 10 according to FIG. 1 and FIG. 2 comprises three closure elements 17', 17", 17''' and a valve block 11 as bottom element. The closure elements 17', 17", 17''' will be described in greater detail later.

The valve block 11 comprises a first fluid duct 32' and a second fluid duct 32" which connect the interior space 25 of the third inner tube 13''' fluidically to the annular spaces 28', 28". Specifically, the first working space 26' is connected fluidically via the intermediate space 27, the first fluid duct 32' and a rebound stage valve 33 to the second annular space 28'''. To this end, the valve block 11 has an inlet opening (not shown) which connects the rebound stage valve 33 fluidically to the second annular space 28'''. In the case of a rebound stage, the hydraulic liquid flows from the first working space 26' through the intermediate space 27, the first fluid duct 32', the rebound stage valve 33 and the inlet opening into the second annular space 28''', and compresses the second gasbag 29'''. Furthermore, the second working space 26'' is connected fluidically via the second fluid duct 32'', a compression stage valve 34 and a second inlet opening 35 to the first annular space 28'. In the case of a compression stage, the hydraulic liquid flows from the second working space 26'' through the second fluid duct 32'', the compression stage valve 34 and the second inlet opening 35 into the first annular space 28', and compresses the first gasbag 29'.

The valve block 11 is arranged in a fluid-tight manner at an end 36 of the tubes 13', 13'', 13''', 14, which end is remote from the piston rod. The outer tube 14 is connected to the valve block 11 in an integrally joined manner. Specifically, the outer tube 14 is welded by way of at least one welded seam 37 to the valve block 11. The outer tube 14 is welded circumferentially to the valve block 11. The outer tube 14 can be welded in sections in the circumferential direction to the valve block 11. The valve block 11 has a first annular projection 38', onto which the outer tube 14 is plugged. In the region of the first annular projection 38', the outer tube 14 is connected to the valve block 11 in an integrally joined manner by way of the welded seam 37.

A first closure element 17' is arranged at the piston rod-side end of the outer tube 14. The first closure element 17' is arranged between the outer tube 14 and the first inner tube 13'. The first closure element 17' closes the first annular space 28' in a fluid-tight manner towards the outside. The first closure element 17' is of annular configuration and protrudes partially into the first annular space 28'. The first closure element 17' has an edge 39 which extends radially to the outside. The edge 39 is arranged spaced apart in the longitudinal direction from the piston rod-side end of the outer tube 14 for the transmission of a prestressing force.

Furthermore, the first closure element 17' has a first sealing element 31' which is arranged radially on the outside. The first sealing element 31' seals the first closure element 17' with respect to the outer tube 14. To this end, the first sealing element 31' interacts in a fluid-tight manner with an inner tube wall of the outer tube 14. The first annular space 28' is closed in a fluid-tight manner on the piston rod side by way of the first closure element 17'.

The vibration damper 10 according to FIGS. 1 and 2 has a first ring nut 16' which transmits a first prestressing force 51 from the outer tube 14 to the first inner tube 13'. To this end, the first ring nut 16' interacts with the outer tube 14 and the first closure element 17'.

According to FIG. 1, the first closure element 17' is welded in a fluid-tight manner to the first inner tube 13'. The outer tube 14 has an external thread, into which the first ring nut 16' engages by way of an internal thread. The first ring nut 16' is screwed to the outer tube 14 in such a way that the first ring nut 16' presses or pushes the first closure element 17' in the direction of the valve block 11, with the result that the first inner tube 13' is prestressed in a fluid-tight manner with an end side against the valve block 11. The first closure element 17' has a bearing region 18, against which the first ring nut 16' bears. The first prestressing force 51 is introduced from the first ring nut 16' via the first closure element 17' into the first inner tube 13', with the result that the first inner tube 13' is pressed in a fluid-tight manner against the valve block 11. The first inner tube 13' is therefore connected to the valve block 11 in a non-positive manner by way of the first prestressing force 51 of the first ring nut 16'.

As shown in FIG. 1, the vibration damper 10 has a second closure element 17'' which is arranged at the piston rod-side end of the first inner tube 13'. The second closure element 17'' closes the second annular space 28''' in a fluid-tight manner towards the outside. The second closure element 17'' is of annular configuration and protrudes partially into the second annular space 28'''. The second closure element 17'' has an edge 39 which extends radially to the outside. The edge 39 bears on the end side against that end of the first inner tube 13' which faces away from the piston rod. The second closure element 17'' is welded in a fluid-tight manner to the first inner tube 13' on the end side by way of the edge 39.

Furthermore, the second closure element 17'' has a second sealing element 31'' which is arranged radially on the inside. The second sealing element 31'' seals the second closure element 17'' with respect to the second inner tube 13''. To this end, the second sealing element 31'' interacts in a fluid-tight manner with an outer tube wall of the second inner tube 13''. The second annular space 28''' is closed in a fluid-tight manner on the piston rod side by way of the second closure element 17''.

According to FIGS. 1 and 2, the respective vibration dampers 10 have a third closure element 17''' which is arranged at the piston rod-side end of the second and third inner tube 13'', 13'''. The third closure element 17''' protrudes partially into the two inner tubes 13'', 13'''. In other words, the third closure element 17''' is arranged at least partially in the second inner tube 13'' and at least partially in the third inner tube 13'''. The piston rod 23 is arranged such that it is guided axially in the third closure element 17'''. In the case of a rebound stage or a compression stage, the piston rod 23 extends from or retracts into the third inner tube 13''' through the third closure element 17'''.

The third closure element 17''' closes the interior space 25 or the first working space 28' of the third inner tube 13''' in a fluid-tight manner towards the outside. The third closure element 17''' is of annular configuration. The third closure element 17''' has an edge 39 which extends radially to the outside. The edge 39 is arranged spaced apart in the longitudinal direction from the piston rod-side end of the third inner tube 13''' for the transmission of a prestressing force.

Furthermore, the third closure element 17''' has a third sealing element 31''' which is arranged radially on the outside. The third sealing element 31''' seals the third closure element 17''' with respect to the second inner tube 13''. To this end, the third sealing element 31''' interacts in a fluid-tight manner with an inner tube wall of the second inner tube 13''. The first working space 26' is closed in a fluid-tight manner by way of the third closure element 17'''.

In the case of the vibration damper 10 according to FIG. 1, the second inner tube 13'' is connected to the valve block 11 in an integrally joined manner at the end 36 which faces away from the piston rod. Specifically, the second inner tube 13'' is welded to the valve block 11 by way of at least one welded seam 37. The second inner tube 13'' is welded circumferentially to the valve block 11. The second inner tube 13'' can be welded in sections in the circumferential direction to the valve block 11. The valve block 11 has a second annular projection 38'', onto which the second inner tube 13'' is plugged. In the region of the second annular projection 38''', the second inner tube 13'' is connected to the valve block 11 in an integrally joined manner by way of the welded seam 37.

Furthermore, the vibration damper 10 according to FIGS. 1 and 2 comprises a second ring nut 16'' which transmits a second prestressing force 52 from the second inner tube 13'' to the third inner tube 13'''. To this end, the second ring nut 16'' interacts with the second inner tube 13'' and the third closure element 17'''.

The second inner tube 13'' has an external thread, into which the second ring nut 16'' engages by way of an internal thread. The second ring nut 16'' is screwed to the second inner tube 13'' in such a way that the second ring nut 16'' presses or pushes the third closure element 17''' in the direction of the valve block 11, with the result that the third inner tube 13''' is prestressed against the valve block 11 in a fluid-tight manner. As can be seen in FIGS. 1 and 2, the third closure element 17''' has a material step 41 to this end, by way of which the third closure element 17''' bears against the end side of the third inner tube 13'''. For the transmission of the second prestressing force 52, the third closure element 17''' interacts by means of the material step 41 with the end side of the third inner tube 13''' in a force-transmitting manner.

The third closure element 17''' has a bearing region 18, against which the second ring nut 16'' bears. The second prestressing force 52 is introduced from the second ring nut 16'' via the third closure element 17''' into the third inner tube 13''', with the result that the third inner tube 13''' is pressed against the valve block 11 in a fluid-tight manner. The third inner tube 13''' is therefore connected to the valve block 11 in a non-positive manner by way of the second prestressing force 52 of the second ring nut 16''.

In the case of the vibration damper 10 according to FIG. 1, the outer tube 14 and the first inner tube 13' form a first tube assembly 12', and the second inner tube 13'' and the third inner tube 13''' form a second tube assembly 12''. Here, each tube assembly 12', 12'' comprises an outer tube and an inner tube. In the case of the second tube assembly 12'', the second inner tube 13'' therefore corresponds to the outer tube, and the third inner tube 13''' corresponds to the inner tube.

In contrast to the vibration damper 10 according to FIG. 1, in the case of the vibration damper 10 according to FIG. 2, the second inner tube 13'' is connected to the valve block 11 in a non-positive manner merely by way of prestress. In other words, in the case of the vibration damper 10 according to FIG. 2, there is no integrally joined connection between the second inner tube 13'' and the valve block 11. Furthermore, in contrast to the first closure element 17' of the vibration damper 10 according to FIG. 1, the first closure element 17' of the vibration damper 10 according to FIG. 2 transmits the first prestressing force 51 merely by way of a positively locking connection to the first inner tube 13'. Here, the welded connection between the first closure element 17' and the first inner tube 13' is dispensed with.

Furthermore, in contrast to the second closure element 17'' according to FIG. 1, the second closure element 17'' according to FIG. 2 is configured in a manner which corresponds to the first closure element 17', as described above. The second closure element 17'' according to FIG. 2 likewise has the second sealing element 31'', with the difference that the second sealing element 31'' seals the second closure element 17'' in a fluid-tight manner with respect to the inner tube wall of the first inner tube 13'. In the case of the vibration damper 10 according to FIG. 2, the seal with respect to the outer tube wall of the second inner tube 13'' can be dispensed with.

In addition, the vibration damper 10 according to FIG. 2 has a third ring nut 16''' which transmits a third prestressing force 53 from the first inner tube 13' via the second closure element 17'' to the second inner tube 13'', with the result that the second inner tube 13'' is prestressed against the valve block 11 in a fluid-tight manner. In other words, the second inner tube 13'' is connected to the valve block 11 in a non-positive manner. The second inner tube 13'' is sealed in a fluid-tight manner with respect to the valve block 11 by way of prestress.

The third ring nut 16''' interacts with the first inner tube 13' and the second closure element 17'' for the transmission of the third prestressing force 53. The first inner tube 13' has an external thread, into which the third ring nut 16''' engages by way of an internal thread. The third ring nut 16''' is screwed to the first inner tube 13' in such a way that the third ring nut 16''' presses or pushes the second closure element 17'' in the direction of the valve block 11, with the result that the second inner tube 13'' is prestressed against the valve block 11 in a fluid-tight manner.

As can be seen in FIG. 2, the first closure element 17' interacts with the first inner tube 13' in a positively locking manner, in such a way that the first prestressing force 51 is transmitted from the first ring nut 16' to the first inner tube 13'. It can be seen, furthermore, that the second closure element 17'' interacts with the second inner tube 13'' in a positively locking manner, in such a way that the third prestressing force 53 is transmitted from the third ring nut 16''' to the second inner tube 13''. In other words, the prestressing forces 51, 53 are transmitted from the respective ring nut 16', 16''' to the inner tube 13', 13'' by way of a positively locking connection between the respective closure element 17', 17'' and the associated inner tube 13', 13''.

To this end, the inner tubes 13', 13'' in each case have a positively locking means 21, against which the respective closure element 17', 17''' bears for the transmission of the prestressing force 51, 53. The positively locking means 21 can be formed by way of a rolled portion and/or a shaped bead. The closure element 17', 17''' have an opposing shaped recess 42, with which the respective closure element 17', 17''' on the positively locking means 21 of the respective inner tube 13', 13'' interacts in a force-transmitting manner for the transmission of the prestressing force 51, 53.

The second closure element 17'' has a bearing region 18, against which the third ring nut 16''' bears. The third prestressing force 53 is introduced from the third ring nut 16''' via the second closure element 17'' into the second inner tube 13'', with the result that the second inner tube 13'' is pressed or prestressed against the valve block 11 in a fluid-tight manner. The second inner tube 13'' is therefore connected to the valve block 11 in a non-positive manner by way of the third prestressing force 53 of the third ring nut 16'''.

LIST OF REFERENCE NUMERALS

10 Vibration damper
11 Valve block
12 Tube assembly
12' First tube assembly
12'' Second tube assembly
13' First inner tube
13'' Second inner tube
13''' Third inner tube 14 Outer tube
15 Axial end
16' First ring nut
16" Second ring nut
16''' Third ring nut
17' First closure element
17" Second closure element
17''' Third closure element
18 Bearing region
19 End side
21 Positively locking means
23 Piston rod
24 Piston
25 Interior space
26' First working space
26" Second working space
27 Intermediate space
28' First annular space
28" Second annular space
29' First gasbag
29" Second gasbag
31' First sealing element
31" Second sealing element
31''' Third sealing element
32' First fluid duct
32" Second fluid duct
33 Rebound stage valve
34 Compression stage valve
35 Second inlet opening
36 End which faces away from the piston rod
37 Welded seam
38' First annular projection
38" Second annular projection
39 Edge
41 Material step
42 Opposing shaped recess
51 First prestressing force
52 Second prestressing force
53 Third prestressing force
100 Stop plate

What is claimed is:

1. A vibration damper for a motor vehicle comprising:
a valve block; and
at least one tube assembly which has at least one inner tube and one outer tube arranged coaxially with the at least one inner tube, the valve block being arranged in a fluid-tight manner at one axial end of the tube assembly,
wherein at least the outer tube is connected in an integrally joined manner to the valve block, and
a ring nut is disposed at least on the outer tube, said ring nut configured to transmit a prestressing force to the at least one inner tube such that the at least one inner tube is connected in a non-positive manner to the valve block.

2. The vibration damper of claim 1 wherein the ring nut is screwed to the outer tube such that the inner tube is prestressed against the valve block in a fluid-tight manner.

3. The vibration damper of claim 1 further comprising at least one closure element arranged between the outer tube and the inner tube, the ring nut transmitting the prestressing force via the closure element from the outer tube to the inner tube.

4. The vibration damper of claim 3 wherein the closure element is connected to the inner tube in an integrally joined manner to transmit the prestressing force.

5. The vibration damper of claim 3 wherein the closure element interacts with the inner tube in a positively locking manner such that the prestressing force is transmitted from the ring nut to the inner tube.

6. The vibration damper of claim 3 wherein the closure element has at least one bearing region, with which the ring nut interacts to transmit the prestressing force.

7. The vibration damper of claim 1 wherein the inner tube is prestressed in a fluid-tight manner with one end side against the valve block via the ring nut.

8. The vibration damper of claim 1 wherein the tube assembly comprises at least three inner tubes, wherein a first ring nut transmits a first prestressing force from the outer tube to a first inner tube, a second ring nut transmits a second prestressing force from a second inner tube to a third inner tube, and a third ring nut transmits a third prestressing force from the first inner tube to the second inner tube, such that the inner tubes are prestressed in a fluid-tight manner against the valve block by way of the first, second, and third ring nuts.

9. The vibration damper of claim 1 further comprising at least two tube assemblies that are arranged coaxially, outer tubes of the at least two tube assemblies being connected to the valve block in an integrally joined manner, and inner tubes of the tube assemblies being prestressed against the valve block for the fluid-tight connection by means of in each case one ring nut.

10. The vibration damper of claim 9 comprising at least one second closure element arranged between the two tube assemblies, which second closure element is configured to seal a compensation space towards the outside.

11. A motor vehicle having at least one vibration damper of claim 1.

* * * * *